July 17, 1951     W. H. HARRISON     2,560,724

MIRROR FOR USE IN DETERMINING COLOR CONTRAST

Filed Dec. 22, 1947

WILLIAM H. HARRISON
INVENTOR.

BY
ATTORNEY.

Patented July 17, 1951

2,560,724

UNITED STATES PATENT OFFICE 2,560,724

MIRROR FOR USE IN DETERMINING COLOR CONTRAST

William H. Harrison, Los Angeles, Calif.

Application December 22, 1947, Serial No. 793,182

4 Claims. (Cl. 88—105)

My invention relates generally to mirrors and more particularly to a mirror adapted to increase the contrast between two differently colored areas which are viewed in the mirror.

While it will become obvious that my improved mirror has many different fields of usefulness in addition to the one herein described, one of the most widely accepted uses of my mirror is in the application of cosmetics. For example, it is desirable to apply a sufficient amount of lipstick to enhance the natural redness of the lips without applying so much that they lose their natural appearance. The amount of coloring which should be applied to secure these desirable results can only be determined by experiment, and after this amount has been determined, it is difficult to duplicate the results at a later time. The application of rouge to the cheeks presents a similar problem, and the application of either of these cosmetics under natural or artificial lights presents further complications.

I have found that by providing a mirror which has a definite spectral characteristic, it is possible to increase the contrast between the area where the particular cosmetic has been applied and the untouched adjacent area. In its broader aspects, my mirror may be said to increase the contrast between two adjacent areas, one of which, the face, has a plurality of colors therein, while the other area, the lips, has substantially only one of the colors found in the first area. As a corollary to the use of my improved mirror in the application of cosmetics, it has been found that mistakes, such as the outlining of the area to be covered, show up more clearly and may thus be corrected with greater ease.

It is therefore a major object of my invention to provide a mirror adapted to increase the contrast between two differently colored adjacent surfaces viewed in the mirror.

Another object of my invention is to provide such a mirror adapted to render one of the surfaces substantially in monochrome while rendering the other surface in substantially its true hue though in reduced brilliance.

It is a further object of my invention to provide a mirror of this type particularly adapted for use in applying cosmetics so as to enable the user to determine when the proper amount has been applied.

Still another object of my invention is to provide a mirror in which the desired spectral characteristics are secured without the use of materials that so greatly reduce the light reflecting characteristics of the mirror as to seriously impair its usefulness.

It is a still further object of my invention to provide a mirror having these general characteristics which can be simply and economically made and can have its spectral characteristics varying from one portion of the mirror to another.

These and other objects and advantages of my invention will become apparent from the following description of preferred and optional forms thereof, and from the drawings illustrating that form in which Fig. 1 is a perspective view of an object and its reflection as seen from my new mirror, the drawing being lined for various shades and hues;

Fig. 3 is a cross-sectional view, on an enlarged scale, of a preferred form of mirror made in accordance with my invention.

Figure 1:
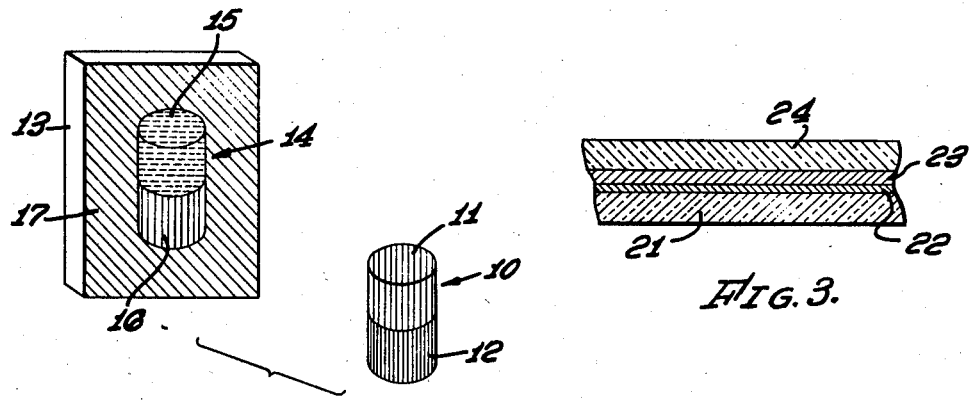

For a clearer understanding of my improved mirror, reference should be had to Fig. 1 where I have illustrated a colored object 10, having a pink or light red section 11 and a dark red section 12. A mirror 13, constructed in accordance with my invention, reflects an image 14 of the object 10, there being a gray or neutral portion 15 corresponding to the section 11, and a red section 16 corresponding to the dark red section 12. The mirror 13 has a greenish cast which is indicated by the area 17 surrounding the reflection 14, this same greenish cast being carried into the section 15 having the neutral or gray coloring. For convenience in reference, it will be noted that the drawing has been lined to show these various shades and hues.

By a method to be hereinafter described, the mirror 13 is so treated that it reflects substantially all of a certain portion of the spectrum, in the present instance the green portion of the spectrum, but reflects less of the remainder of the spectrum, here the red and blue. Consequently, a surface such as the section 11 which reflects a substantially large amount of white light and only a relatively small proportion of red, will have a large amount of that red absent in the image reflected by the mirror 13. Thus, the red and white which are combined to form the pink of the surface 11, are transmitted to the mirror 13; and the white light from the surface 11 will be reflected from the mirror with a generally greenish cast, while the red, which is largely absorbed by the mirror, will be largely absorbed thereby as to appear as a darker area.

Where there is a higher percentage of red in the surface, as in the section 12, the mirror 13 will absorb a portion of this red light, but will reflect the remainder thereof since the characteristics of the mirror are such that not all of the red is absorbed but only a certain percentage thereof. Consequently, the section 15 of the image 14 will appear as a greenish gray, while the section 16 will appear red against a green or greenish background 17.

Figure 2:
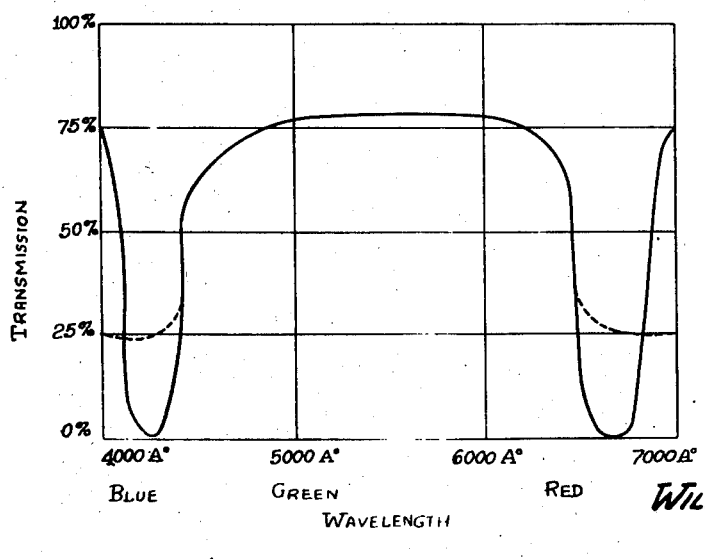
Fig. 2 is a graph indicating the transmission characteristics of a filter used in the production of my improved mirror.

To secure this particular type of reflection from the mirror 13, a light filter must be associated therewith having certain definite characteristics. In Fig. 2, I have illustrated the transmission characteristics of a filter meeting these requirements, it being understood that this particular filter is intended to be used to increase the contrast between two adjacent surfaces, one of which reflects substantially only red light, while the adjacent surface reflects red and other colors. It will be appreciated that if the contrast with another color, such as yellow instead of red, is to be increased, a filter having different characteristics would be used.

It will be noted that the major portion of the spectrum, centering around the green portion thereof, is transmitted by the filter with relatively little absorption. It will be appreciated that any practical filter will absorb a certain portion of all light of whatever wave length falls upon it, and hence it is not feasible to make a filter which will have one hundred per cent transmission except in a very limited region. Consequently, I have shown a filter which has a transmission of approximately seventy-five per cent, or better over the major portion of the visible spectrum, this being a value which can be readily obtained by methods which are suitable to quantity production.

However, at the red end of the spectrum, the filter is designed to absorb or reject a relatively narrow band of red light. This is indicated by the dip in the curve which occurs at approximately 6500Å. In a similar manner, the filter rejects or absorbs a relatively narrow band in the blue portion of the spectrum, roughly between 4000Å. and 4500Å. It will be noted that the filter provides what may be termed a "vertical cut" wherein a relatively narrow band is substantially completely eliminated, instead of providing a "horizontal cut" where a relatively wide band of color is transmitted at a reduced intensity. I have found that if approximately twenty-five per cent of each of the red and blue portions of the spectrum are so absorbed, very satisfactory results are obtained. While it is conceivable that desirable results could be obtained with a filter which transmitted twenty-five per cent of the red light shining thereon, regardless of the wave length, with a similar type of transmission in the blue end of the spectrum, this would require that the ends of the spectral transmission curve have the general shape indicated in dotted outline, and a filter having such a transmission characteristic is substantially impossible to obtain. The latter curve indicates the use of a filter having a "horizontal cut" instead of the "vertical cut" previously mentioned, and presently available dyes for use in the filter itself do not have, either individually or in combination, such transmission characteristics. While various combinations of dyes may be used which give an approximation of the second mentioned curve, in general these dyes do not transmit such a large percentage of the green portion of the spectrum, so that there is a smaller ratio between the so-called "transmitted" portion of the spectrum and the "absorbed" portion thereof. This, of course, decreases the resulting contrast, and tends to produce a mirror which is too dark. Consequently, I have found that the only practical solution is to use a filter making use of a vertical cut as opposed to a horizontal cut in the blue and red portions of the spectrum.

While it is not so important from the standpoint of securing contrast, the transmission characteristics of the filter at the ends of the spectrum should be such that these end portions are transmitted substantially as readily as the middle portion or green section. In this manner, the overall transmission of the filter is increased so that objects may be viewed more clearly.

While the reason for the vertical cut in the red region of the spectrum is obvious, the reason for the blue cut may not be so clear. However, it should be remembered that this particular filter is designed for use in the application of cosmetics, and it will be realized that there are substantially no spectrally pure colors used in cosmetics. The red of a rouge or lipstick often reflects a certain amount of yellow light, and equally or more often it reflects a certain amount of blue light. Consequently, for all practical purposes, a filter must be designed to decrease the transmission of the blue portion of the spectrum as well as decreasing the transmission of the red portion.

From the standpoint of the appearance of the transmission curve, it would appear that the filter having the curve shown in Fig. 2 would produce the same desirable result if an attempt were made to distinguish between various shades of blue. However, it will be realized that blue and green are not complementary colors, while red and green are. Consequently, the contrast between the red and green surfaces will be very marked, while the contrast between blue and green surfaces will be much more difficult to detect.

When there is only a slight amount of red in the light which falls upon the mirror 13, as is the case of the light from the pink section 11, the reflection 15 of that section has a definite greenish cast even though there may be a slight amount of red in that portion of the reflected image. As the amount of red in the lighter section 11 is increased, the reflection 15 of that section retains its greenish cast until a particular point is reached where the reflection seems to change to a brownish or brick red color. Thereafter, any additional increase in the red of the section 11 will cause the reflected image 15 to appear as a very definite red. If the filter is so designed that a definite shade of red always appears as a brick red when viewed in the mirror 13, that same shade may be duplicated whenever desired by applying pigment until the same brick red color is produced. The denser the filter, optically speaking, the redder the object must be before its reflection has the desired brick red color. Consequently, by providing a series of filters, any desired shade of red may be duplicated as often as desired.

The operation of my improved filter in the application of cosmetics will now be more clearly understood. Assuming that a woman has previously selected a certain mirror as having the proper density of filter to produce the desired results, she first views her face in the mirror, and sees her lips as having a definitely greenish cast. She then applies lipstick until the previously mentioned brick red color is secured, at which time she knows that the proper amount of color has been applied to her lips. Should she apply too much, her lips will then have a very definitely red color which is readily distinguishable from the brick red color indicating the proper amount, and if she fails to apply enough, her lips will still retain their greenish tinge. In this way, a very accurate gauging means is provided to determine the correct amount of lipstick to apply.

It will be realized that the color of the incident light falling upon the face of the user will materially affect the color of the resulting reflected image. Since incandescent light is very rich in red and quite deficient in blue light, a mirror which has been selected on the basis of indicating the proper results when used with natural or daylight will not produce the same results when used with incandescent light. Consequently, a mirror intended for use under incandescent light will be more dense to provide a certain amount of compensation for the overabundance of red in the incident light. Thus by the simple expedient of using two mirrors, a woman may be assured that the amount of lipstick she applies is the same as that which has previously been determined to give her the most pleasing appearance, and this may be done whether the lipstick is applied under natural or artificial light. If desired, a single mirror having a graduated filter incorporated therein may be used in place of the two separate mirrors.

In the construction of a mirror manufactured in accordance with my invention, I have found it very desirable to use an optical filter having the filtering medium enclosed between two pieces of glass. The filter medium is thus protected from any abrasion, and in addition, by selecting a medium having the proper index of refraction, it may be bonded to the glass so that there is no boundary between the two which tends to reflect light. This reduces the tendency to form multiple reflections, and produces a very much more desirable mirror.

While it would be possible to use a solid glass filter having the desired characteristics, it is very difficult to control the manufacture of such types of glass so that the desired optical characteristics are secured, and the consequent cost of such a filter would render a mirror constructed in this manner much too expensive for general use. A gelatine filter may be bonded or otherwise cemented between two pieces of glass, but the difference in index of refraction between gelatine and glass is such as to tend to produce the previously mentioned multiple images. Consequently, I have found that one of the most satisfactory ways of producing a mirror of this type is by using a dyed cement having the proper index of refraction. An example of such a cement is Canada balsam and this cement may have the proper dyes incorporated in it to produce the desired filter characteristics. The Canada balsam and dyes will be mixed to secure a uniform color, and it will be realized that the transmission of the resulting cement will be a function of its thickness.

In Fig. 3 I have illustrated what is probably my preferred form of mirror construction, it being understood that modifications may be made therein in accordance with the particular needs. As indicated in this figure, I coat one surface of a sheet of transparent glass 21 with a mirror surface 22, this being done in any convenient manner. The reflective coating 22 adheres firmly to the glass 21, and on the exposed surface of the reflective coating I place a thin layer of colored cement 23, such as that previously described. A piece of clear glass 24 is then placed upon the cement 23, and the two pieces of glass are pressed together to form a secure bond. As mentioned, the thickness of the cement 23 will determine the amount and color of the light which is reflected, and hence by controlling the separation between the plate 24 and the mirror surface 22, mirrors having different visual effects may be produced.

It will be recognized that light entering the glass 24 will pass through the filter or cement 23 twice before that light again emerges from the glass. Consequently, it is quite important that the filter have a high transmission in order that the mirror appear no darker than necessary. The transmission of the filter 23 may be varied by changing the concentration of the dye therein, but once a particular concentration has been selected, the transmission may be further varied, as previously mentioned, by changing the thickness of the cement 23. Consequently, by providing stops or other suitable gauging means in the presses which force the two pieces of glass 21 and 24 together, completed mirrors having any desired spectral characteristics may be obtained.

Any light entering the surface of the glass 21 will be reflected directly from the reflecting surface 22 without passing through any filter layer, and hence will not have its spectral characteristics changed except as may be accomplished by the glass 21. This forms a very desirable combination, since one surface of the reflecting coating 22 will operate in conjunction with the filter 23 to provide an indication as to the proper amount of cosmetics to be applied, while the other surface of the reflective coating will permit the user to view herself as others see her.

As previously mentioned, a gelatine filter may be used in place of the cement previously mentioned to form the filter layer 23, but gelatine has the disadvantage of having a different index of refraction from that of glass and hence there is a tendency for such a mirror to form multiple images or "ghosts." However, under certain circumstances, it may be found desirable to use the gelatine type filter, and under these conditions a very thin coating of clear cement may be applied to firmly bond the various elements together.

Figure 4:
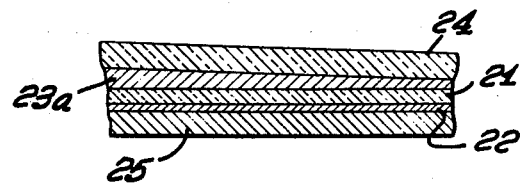
Fig. 4 is a cross-sectional view, likewise to an enlarged scale, of an optional form of mirror.

In Fig. 4 I have illustrated an optional form of construction having two important differences from the previously mentioned form. In the form shown in Fig. 4, the reflective coating 22 is applied to a supporting glass plate 21 as previously described, and a coating of cement 23a, having the proper dyes therein, is applied to the opposite surface of the glass. Finally, a protective glass 24 is placed upon the cement 23a, and the entire assembly is mounted in a frame or support 25 which covers and protects the exposed surface of the reflecting surface 22. In this form, it will be noted that the reflective surface 22 may be viewed only through the filter 23a, and there is no provision made for viewing the opposite surface of the reflective coating.

In addition, it will be noted that the coating 23a is thicker at one side, the left, than it is at the opposite, thereby producing a wedge effect so that a filter of constantly varying density is produced. In this way, a single mirror assembly may be produced which is suitable for use with either daylight or incandescent light, to indicate any desired amount of lipstick.

While there are obviously many different ways of producing the wedge-shaped filter 23a shown in Fig. 4, one of the most convenient methods is to use the general procedure disclosed in my prior Patent No. 2,331,027 entitled "Optical Wedge," and issued October 5, 1943. While this prior patent was directed to the manufacturer of a circular wedge, the same general procedure including the use of spacers between the two adjacent pieces of glass may be used in the presently described invention.

I have shown and described my improved mirror as it may be designed for use in the application of cosmetics, but it will be understood that the fundamental concepts disclosed herein may be used wherever it is desired to increase the visual contrast between two adjacent surfaces, one of which reflects substantially only one color, while the other surface reflects substantially all colors. If a pair of green surfaces were to be compared and contrasted, for example, a mirror would be selected having a slightly reddish cast but which would nevertheless reflect a certain amount of green light. The spectral transmission curve of the filter would have substantially the same form as that shown in Fig. 2, with the exception that the position of the vertical cuts would be displaced from that shown. Other colors may be similarly compared, the necessary changes being obvious to those skilled in the art.

While I have shown and described a preferred and optional form of my invention, and the method of producing the same, it will be realized that modifications may be made such as those mentioned above without departing from the broad features of my invention as herein defined. Consequently, I do not wish to be limited to the particular form or arrangement of parts herein described and shown, except as restricted by my claims.

I claim:

1. A mirror adapted to determine the color saturation of an essentially monochromatic red area as well as to distinguish between that area and a polychromatic area, primarily for matching lipstick or rouge, which includes: a transparent member of substantially colorless material; a backing member associated with said transparent member; an optical filter between said backing member and said transparent member, said transparent member, filter and backing member being in contacting relation to form an integral structure, said filter transmitting the major portion of the visible spectrum substantially undiminished, but having a vertical cut between 6000 Å. and 7000 Å., and a second vertical cut between 4000 Å. and 5000 Å., said cuts being in the red and blue portions of the spectrum, respectively, both of said cuts being spectrally located so that visible radiation on both sides of said cuts is transmitted through said filter, said cuts being sufficiently broad to materially reduce the transmission of their respective colors, but narrow enough to pass an appreciable amount of said colors; and a reflecting layer on said backing member reflecting light passing through said filter whereby a reflected image of said area whose color saturation is to be determined, may be seen, and whereby a red area having less than a predetermined color saturation reflected on a mirror selected for such predetermined saturation appears greenish, an area having the predetermined saturation appears brownish or brick red, and an area having greater than the predetermined saturation appears definitely red.

2. A mirror as defined in claim 1 in which said reflecting layer is disposed on the face of said backing member in contact with said filter.

3. A mirror as defined in claim 1 in which said backing member has one face in contact with said filter and further has its opposite face provided with said reflecting layer.

4. A mirror as defined in claim 1 in which said filter is of constantly varying thickness.

WILLIAM H. HARRISON.

REFERENCES CITED

The following references are of record in the file of this patent:

UNITED STATES PATENTS

| Number | Name | Date |
|---|---|---|
| 988,710 | Holbrook | Apr. 4, 1911 |
| 1,698,307 | La Hodny | Jan. 8, 1929 |
| 1,768,812 | Whiting | July 1, 1930 |
| 1,951,213 | Schlumbohm | Mar. 13, 1934 |
| 1,951,214 | Schlumbohm | Mar. 13, 1934 |
| 1,960,514 | Ross | May 29, 1934 |
| 1,990,143 | Snow | Feb. 5, 1935 |
| 2,403,685 | Sachtleben | July 9, 1946 |

FOREIGN PATENTS

| Number | Country | Date |
|---|---|---|
| 15,678 | Great Britain | July 4, 1912 |
| 390,542 | Germany | Feb. 20, 1924 |
| 126,283 | Austria | Jan. 11, 1932 |
| 549,649 | Great Britain | Dec. 1, 1942 |
| 559,865 | Great Britain | Mar. 8, 1944 |